United States Patent [19]
Drescher

[11] 3,750,594
[45] Aug. 7, 1973

[54] DOLLY SYSTEM
[75] Inventor: Warren F. Drescher, Vienna, Ohio
[73] Assignee: Albee Homes, Inc., Niles, Ohio
[22] Filed: Feb. 1, 1971
[21] Appl. No.: 111,579

[52] U.S. Cl. .................................. 104/243, 238/13
[51] Int. Cl. ............................................. E01b 5/00
[58] Field of Search ................ 105/368 B; 104/242, 104/26, 88, 243; 238/13, 10

[56] References Cited
UNITED STATES PATENTS

| 3,408,950 | 11/1968 | Puhringer | 105/177 |
| 90,432 | 5/1869 | Devlan | 104/243 |
| 388,743 | 8/1888 | Thompson | 104/243 |
| 690,597 | 1/1902 | Meader | 104/243 |
| 955,382 | 4/1910 | Clark | 104/243 |
| 2,884,870 | 5/1959 | Day | 105/368 B |
| 3,610,169 | 10/1971 | Shannon | 105/368 B |

Primary Examiner—Robert G. Sheridan
Assistant Examiner—Richard A. Bertsch
Attorney—Clarence A. O'Brien and Harvey B. Jacobson

[57] ABSTRACT

A dolly system utilized in moving modular units in an assembly plant. The system incorporates a series of parallel floor embedded two-rail tracks, one rail of each track having a guide bar provided longitudinally along the upper surface thereof. A dolly rides on each track, the dolly including an elongated support beam mounted on front and rear wheels, one set of front and rear wheels including annular grooves which receive and guide along the guide bar.

10 Claims, 3 Drawing Figures

PATENTED AUG 7 1973 3,750,594
Fig. 1
Fig. 2
Fig. 3
Warren F. Drescher
INVENTOR.
BY Clarence A. O'Brien
and Harvey B. Jacobson
Attorneys
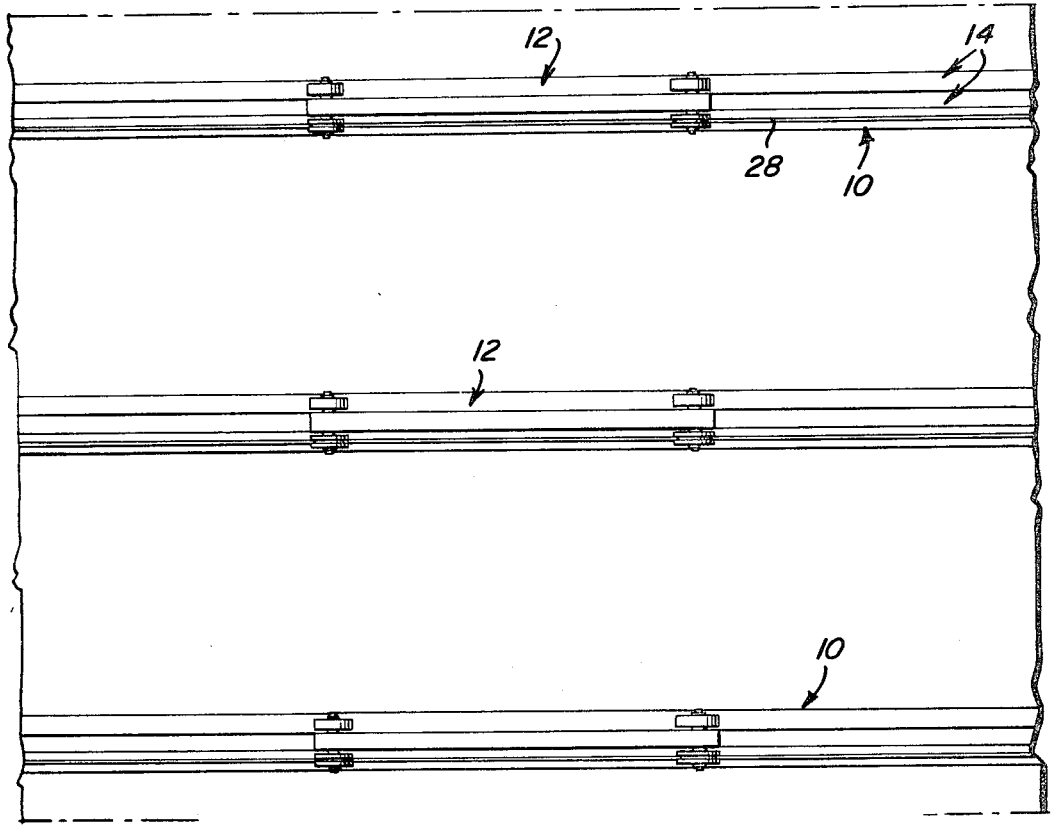
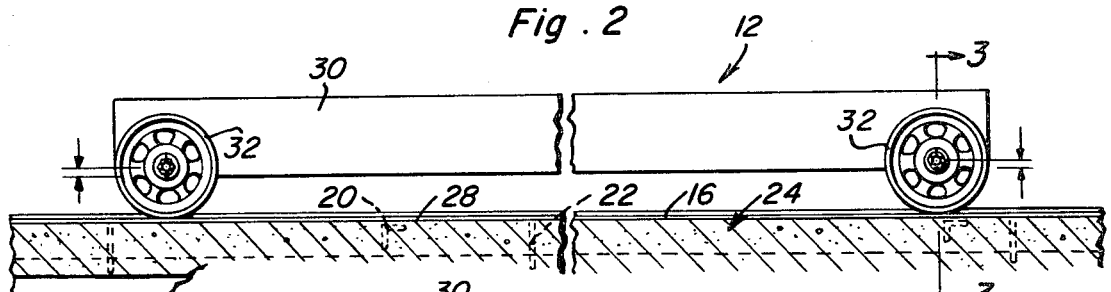
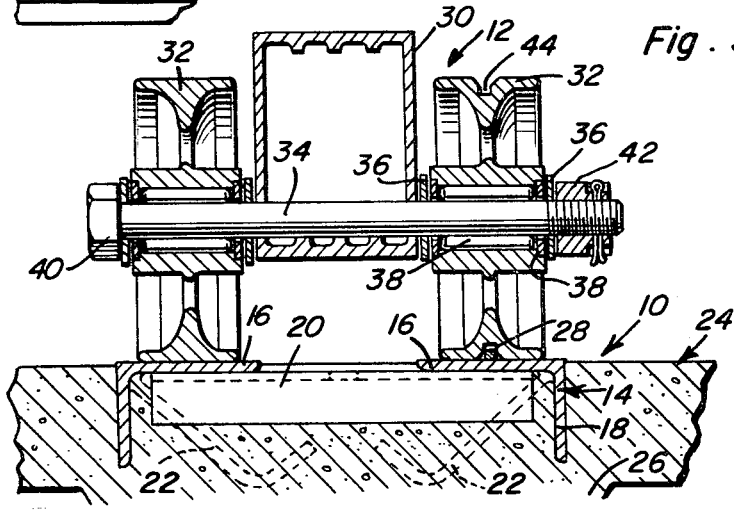

DOLLY SYSTEM

The invention herein is generally concerned with the provision of means for moving modular units, normally units being assembled into mobile or prefabricated homes, within an assembly plant. More specifically, the present invention is directed to an unique mobile support dolly which, in sets of three, provides a transport carriage for a modular unit.

It is a primary object of the instant invention to provide a dolly system for the movement of large units which is able to not only stably accommodate and provide for a simplified movement of the units, but also not in itself be cumbersome or interfer with flow patterns within the plant and the normal movement of employees.

Other objects of the instant invention include the provision of a system wherein the dollies are adapted to accommodate substantially any shaped unit thereon and are engaged with floor embedded tracks in a manner so as to provide for a guided travel of the supported unit without requiring any elaborate guidance systems.

Basically, the objects of the instant invention are achieved through the provision of a system whereby a plurality of laterally spaced parallel floor embedded tracks are provided. Each track is formed of dual rails, one of which includes a guide bar or rod fixed therealong. A dolly rides on each track with each dolly comprising an elongated load receiving box beam supported by front and rear wheels, the front and rear wheels on one side of the beam incorporating peripheral grooves which receive and guide the dolly along the track mounted bar. The forward end of each dolly beam is slightly higher than the rear end thereof to keep the load level while being conveyed along a slightly inclined floor and track which facilitates the initial movement of the load and simplifies the rolling of the unit from one station to another.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a plan view of the dolly system of the instant invention;

FIG. 2 is a side elevational view of one of the dollies and

FIG. 3 is an enlarged cross-sectional view taken substantially upon a plane passing along section line 3—3 in FIG. 2.

Referring now more specifically to the drawings, the system of the instant invention consists basically of a plurality of sets of tracks 10, normally three, each of which mounts a rolling dolly 12 for travel therealong.

With reference to the cross-sectional view of FIG. 3 in particular, it will be appreciated that each set of the tracks 10 consists of a pair of laterally spaced parallel rails 14. Each of the rails 14 is in the nature of an elongated angle bar having a laterally inwardly directed horizontal upper flange 16 orientated at floor level, and a vertical flange 18 embedded within the floor, the floor incidentally normally being of reinforced concrete. The rails 14 are interconnected by transversely extending angle bars 20 welded to the under surfaces of the inwardly directed upper flanges 16 and provided at approximately 10 foot centers as well as at the opposed ends of the track. The track is further anchored into the floor by the provision of reinforcing bars 22 located at spaced points along each of the track rails 14. Each bar 22 has one end thereof welded at the joint between the rail flanges 16 and 18 and extends inwardly therefrom at approximately a 45° angle to a point vertically aligned with the inner edge of the corresponding horizontal flange 16, at which point the anchoring bar 22 angles upwardly, also at approximately 45°, and terminates just short of the longitudinal center line of the track 10. In order to accommodate the load to be introduced onto the tracks 10, it is contemplated that the concrete floor 24 which receives the track be of a greater depth, as indicated by reference numeral 26, immediately below each embedded track. For example, assuming a 6 inch conventional floor, the depth thereof longitudinally along and below each track will be approximately 8 inches. The track 10 is completed by the provision of a rigid guide bar or rod 28 centrally along the upper horizontal flange 16 of one of the track rails 14. As will be appreciated, this bar, which is normally a three-eighths inch round bar, is rigidly welded to the flange 16 and constitutes the only projection above floor level, this projection being minor and in no way interfering with travel or movement about the plant. Finally, both the tracks 10 and the floor 24 slope slightly downward in the direction of forward movement to facilitate this movement.

The dolly 12 associated with each track consists basically of an elongated hollow rectangular beam 30 supported at the forward and rear ends by front and rear support wheels 32. With reference to FIG. 3 in particular, each pair of wheels 32 is rotatively received on the opposite projecting ends of a transverse bolt or axle 34. This axle 34 extends through the beam 30 and beyond both sides thereof. Each of the wheels 32 is mounted on the axle or bolt 34 between inner and outer washers 36 and engages the shaft 34 through wheel mounted roller bearings 38 which allow for a free wheeling rotation of the wheel 32 on the shaft 34. One end of the shaft 34 incorporates an enlarged retaining head 40 thereon, while the second end thereof is threaded and receives a cotter pin locked nut 42.

The wheels 32 to one side of the load receiving and supporting tube or beam 30 incorporate centrally located annular grooves 44. These grooves or recesses 44, having a slightly flared outer mouth, accommodate the associated rail bar 28 and completely receive the bar while the adjoining portions of the outer surface of the wheel 32 seat on the rail flange 16. Thus, the two wheels 32 act so as to guide the dolly 12 along the bar mounting rail with the slightly widened mouth of the wheel grooves insuring a proper reception of the bar therein as the dolly travels forwardly, thus providing a simple although highly effective guidance system.

With reference to FIG. 2, attention is directed to the fact that the rear wheels, located at the left hand side of the drawing, have the axle thereof mounted a greater distance above the bottom of the support beam 30 than the axle of the front set of wheels. With this arrangement, the load receiving beams 30 of the dollies 12 remain level while the tracks 10 and floor 24 slope slightly in the direction of forward movement. In this manner, there is a tendency for the weight of the superimposed load to help the forward motion. This also facilitates an initial moving of the load from the at rest position. This is considered a distinct advantage in view of the large components, for example modular homes, which are to be handled by the dollies 12.

The dollies 12, notwithstanding the positive guided cooperation thereof with the tracks 10, can be easily removed from the tracks by merely lifting the grooved wheels from the associated guide bar 28, and in this manner leave a completely clear floor space, the surface of which is interrupted only by the very slightly protruding bars or rods 28. As will be appreciated, the tracks provide a more durable wearing surface than the concrete floor. Further, since the peripheral grooves are on wheels on one side of the beam only, there is no chance of placing the dolly on the track going in the wrong direction.

From the foregoing, it will be appreciated that a highly unique dolly system has been defined. This system, notwithstanding its ability to accommodate and handle substantial loads, is compact, easily manipulated, and of simple construction uniquely adapted for substantially any assembly plant setup.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. A dolly system, comprising, in combination:
   a. a plurality of dollies, each dolly having an elongated load supporting beam, and wheels mounted on said beam, said wheels including a front and rear wheel arranged to each side of the beam, with endless peripheral grooves provided on front and rear wheels to one side of the beam; and
   b. a series of parallel two-rail longitudinally elongated tracks, each track having an associated, separate dolly mounted for travel therealong, and one rail provided with a guide bar arranged longitudinally along and extending above an upper surface of the rail arranged substantially level with a floor for engaging the peripheral grooves and guiding the associated dolly as it moves along the track.

2. The system of claim 1 wherein each track has means interconnecting said rails below the upper surface thereof, and anchor means engaged with said rails and depending therefrom for an anchoring of the rails within the floor.

3. The system of claim 2 wherein said rear wheels mount said beam in a manner whereby the front portion of said beam is slightly lower than the rear portion thereof.

4. The system of claim 1 wherein each dolly is on an inclined track toward the direction of travel for facilitating an initial movement of the loaded dollies from an at rest position.

5. The system of claim 3 wherein each dolly is on an inclined track toward the direction of travel for facilitating an initial movement of the loaded dollies from an at rest position.

6. In a dolly system, an elongated floor embedded track, said track presenting a flat upper surface substantially level with the surface of the floor, and an elongated guide bar affixed to said track longitudinally along and extending above the upper surface thereof, and a dolly mounted for travel along said track, said dolly comprising an elongated load support member orientated longitudinally along said track, and wheel means mounting said member for rolling movement along said track, said wheel means incorporating endless peripheral grooves receiving and confining said track bar upon movement of the dolly therealong whereby a guiding of the dolly on the track is effected.

7. The system of claim 6, wherein the track comprises a pair of laterally spaced parallel rails, means interconnecting said rails below the upper surface thereof, and anchor means engaged with said rails and depending therefrom for an anchoring of the rails within the floor, the guide bar being affixed to one of said rails.

8. The system of claim 7, wherein the track is inclined toward the direction of travel of the dolly for facilitating initial movement of the dolly from an at rest position.

9. The system of claim 6, wherein said wheel means mount the load support member in a manner whereby the front portion of said load support member is slightly lower than the rear portion thereof.

10. The system of claim 1, wherein there is a laterally spaced further track parallel to said track, and the wheel means includes a front and rear wheel at each longitudinal side of the support member, selected rear wheels arranged to one side of the support member being provided with the peripheral grooves.

* * * * *